(12) United States Patent
Nishimura et al.

(10) Patent No.: US 10,933,374 B2
(45) Date of Patent: Mar. 2, 2021

(54) EXHAUST EMISSION CONTROL DEVICE, METHOD AND COMPUTER PROGRAM PRODUCT FOR AN ENGINE

(71) Applicant: Mazda Motor Corporation, Hiroshima (JP)

(72) Inventors: Hiroyuki Nishimura, Hiroshima (JP); Koichi Sugimoto, Hiroshima (JP); Masanobu Kanno, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 62 days.

(21) Appl. No.: 16/263,376

(22) Filed: Jan. 31, 2019

(65) Prior Publication Data

US 2019/0232225 A1   Aug. 1, 2019

(30) Foreign Application Priority Data

Feb. 1, 2018   (JP) .............................. JP2018-016380

(51) Int. Cl.
*B01D 53/94*   (2006.01)
*F01N 3/035*   (2006.01)
(Continued)

(52) U.S. Cl.
CPC ..... *B01D 53/9495* (2013.01); *B01D 53/9459* (2013.01); *F01N 3/035* (2013.01);
(Continued)

(58) Field of Classification Search
CPC ............... F01N 13/009; F01N 13/0097; F01N 2430/085; F01N 2510/06; F01N 2900/0418; F01N 2900/08; F01N 2900/10; F01N 2900/1602; F01N 2900/1612; F01N 2900/1614; F01N 3/035; F01N 3/0814; F01N 3/0835; F01N 3/0842; F01N 3/0871; F01N 3/0885; F01N 3/103; F01N 3/2066; F01N 9/00; F02D 2200/0802; F02D 2200/0806; F02D 41/027; F02D 41/0275; F02D 41/028; F02D 41/029; F02D 41/405

See application file for complete search history.

(56) References Cited

U.S. PATENT DOCUMENTS

| 10,344,642 | B2 * | 7/2019 | Montinaro | ............ F01N 3/0814 |
| 2015/0090020 | A1 | 4/2015 | Takita et al. | |
| 2017/0226911 | A1 * | 8/2017 | Haas | ..................... F01N 3/0842 |

FOREIGN PATENT DOCUMENTS

JP   2015-068280 A   4/2015

* cited by examiner

*Primary Examiner* — Anthony Ayala Delgado
(74) *Attorney, Agent, or Firm* — Xsensus LLP

(57) ABSTRACT

An exhaust emission control device for an engine is provided with a first purifying catalyst including an HC adsorbent that adsorbs HC at a low temperature and releases HC at a high temperature and a diesel oxidation catalyst capable of oxidizing HC, a second purifying catalyst including a NOx catalyst capable of storing NOx contained in exhaust, a NOx catalyst regenerator that regenerates the NOx catalyst while raising the temperature of the NOx catalyst, and HC controller that decides whether the amount of adsorbed HC that is HC adsorbed by the HC adsorbent is equal to or more than a preset reference amount and, when the amount of adsorbed HC is decided to be equal to or more than the reference amount, raises the temperature of the first purifying catalyst.

20 Claims, 8 Drawing Sheets

(51) Int. Cl.
   *F01N 13/00* (2010.01)
   *F01N 3/08* (2006.01)
   *F02D 41/02* (2006.01)
   *F01N 3/10* (2006.01)
   *F01N 9/00* (2006.01)
   *F01N 3/20* (2006.01)
   *F02D 41/40* (2006.01)

(52) U.S. Cl.
   CPC ......... *F01N 3/0814* (2013.01); *F01N 3/0835* (2013.01); *F01N 3/0842* (2013.01); *F01N 3/0871* (2013.01); *F01N 3/103* (2013.01); *F01N 9/00* (2013.01); *F01N 13/009* (2014.06); *F02D 41/028* (2013.01); *F02D 41/0275* (2013.01); *F01N 3/0885* (2013.01); *F01N 3/2066* (2013.01); *F01N 13/0097* (2014.06); *F01N 2430/085* (2013.01); *F01N 2510/06* (2013.01); *F01N 2900/0418* (2013.01); *F01N 2900/08* (2013.01); *F01N 2900/10* (2013.01); *F01N 2900/1602* (2013.01); *F01N 2900/1612* (2013.01); *F01N 2900/1614* (2013.01); *F02D 41/027* (2013.01); *F02D 41/029* (2013.01); *F02D 41/405* (2013.01); *F02D 2200/0802* (2013.01); *F02D 2200/0806* (2013.01)

EXHAUST EMISSION CONTROL DEVICE, METHOD AND COMPUTER PROGRAM PRODUCT FOR AN ENGINE

CROSS REFERENCES TO RELATED APPLICATIONS

This application claims priority to Japanese Patent Application 2018-016380, filed on Feb. 1, 2018, which is incorporated herein by reference. This application is also related to co-pending U.S. application Ser. No. 16/262,977, which is entitled "EXHAUST GAS CONTROL DEVICE, METHOD, AND COMPUTER PROGRAM PRODUCT FOR AN ENGINE," filed concurrently with the present application, which is also incorporated by reference.

TECHNICAL FIELD

The present disclosure relates to an exhaust emission control device for an engine including an engine body in which a cylinder is formed and an exhaust passage through which exhaust discharged from the engine body flows.

BACKGROUND ART

Conventionally, a catalyst device is provided in an exhaust passage to purify exhaust discharged from an engine body.

For example, PTL 1 discloses an engine that has, in an exhaust passage, a diesel oxidation catalyst capable of oxidizing hydrocarbon (HC) and the like in exhaust and an HC adsorbent that adsorbs HC in exhaust at a low temperature and releases HC at a high temperature.

In this engine, even when the diesel oxidation catalyst is not activated sufficiently such as during cold start, the HC adsorbent can temporarily adsorb HC. Then, when the temperature of the HC adsorbent and the temperature of the diesel oxidation catalyst are raised, HC released from the HC adsorbent can be oxidized by the diesel oxidation catalyst. Accordingly, the amount of HC discharged to the outside of the engine can be kept small.

PRIOR ART DOCUMENTS

Patent Documents

[Patent Document 1] JP-A-2015-068280

SUMMARY

Problems to be Solved by the Embodiments

As recognized by the present inventors, in an engine that has a nitrogen oxide (NOx) catalyst capable of storing NOx contained in an exhaust passage to suppress the emission of NOx to the outside of the engine and performs control for removing NOx stored in the NOx catalyst while raising the temperature of the NOx catalyst, if the HC adsorbent and the diesel oxidation catalyst configured as described above are disposed in the exhaust passage together with the NOx catalyst, the purification performance of the NOx catalyst may be declined. Specifically, when control for removing NOx from the NOx catalyst is performed, the HC adsorbent is also raised in temperature as well as the NOx catalyst. Consequently, a large amount of HC is released from the HC adsorbent. Then, the released HC undergoes an oxidation reaction with the diesel oxidation catalyst to further raise the temperature of the NOx catalyst, possibly declining the performance of the NOx catalyst.

The present disclosure addresses the above situations and provides an exhaust emission control device for an engine capable of keeping the purification performance of the NOx catalyst high while keeping the amount of discharged HC small.

Means for Solving the Problems

To solve the above-described and other problems, according to the disclosure, there is provided an exhaust emission control device (or simply a controller or circuitry that is configured to control the exhaust emission) to be applied to an engine including an engine body in which a cylinder is formed and an exhaust passage through which exhaust discharged from the engine body flows, the exhaust emission control device for an engine including a first purifying catalyst provided in the exhaust passage, the first purifying catalyst including a hydrocarbon (HC) adsorbent that adsorbs HC at a low temperature (e.g. 400° C., or less such as 300° C., 200° C. or lower) and releases HC at a high temperature (e.g. 400° C., or less such as 300° C., 200° C. or higher) and a diesel oxidation catalyst capable of oxidizing HC; a second purifying catalyst provided in the exhaust passage, the second purifying catalyst including a nitrogen oxide (NOx) catalyst capable of storing NOx contained in exhaust; a NOx catalyst regenerator that regenerates the NOx catalyst while raising a temperature of the NOx catalyst; and an HC controller that decides whether an amount of adsorbed HC that is HC adsorbed by the HC adsorbent is equal to or more than a preset reference amount and, when the amount of adsorbed HC is decided to be equal to or more than the reference amount, raises a temperature of the first purifying catalyst.

Since this device is provided with the first purifying catalyst including the HC adsorbent and the diesel oxidation catalyst and the second purifying catalyst including the NOx catalyst in the exhaust passage, it is possible to suppress the emission of NOx and HC to outside of the exhaust passage.

Moreover, since the temperature of the first purifying catalyst is raised when the amount of adsorbed HC that is HC adsorbed by the HC adsorbent is equal to or more than the reference amount, the amount of HC adsorbed by the HC adsorbent included in the first purifying catalyst can be almost always kept to small in this device. Therefore, even when the NOx catalyst is raised in temperature when regenerated and thereby the temperature in the exhaust passage and therefore the temperatures of the first purifying catalyst and the HC adsorbent are raised, it is preventing a large amount of HC from being released from the HC adsorbent. Accordingly, it is possible to prevent the temperature of the NOx catalyst from being excessively raised by a rise in the temperature in the exhaust passage due to an oxidation reaction of the large amount of released HC with the diesel oxidation catalyst, thereby enabling the purification performance of the NOx catalyst to be kept high.

In the above structure, the exhaust emission control device for an engine further includes a fuel injector capable of injecting fuel into the cylinder, in which the HC controller causes the fuel injector to inject the fuel into the cylinder in a first half of a combustion stroke and the fuel to burn in the cylinder when determining that the amount of adsorbed HC is equal to or more than the reference amount.

In this structure, it is possible to release HC from the HC adsorbent by raising the temperature of exhaust gas and thereby the temperature of the first purifying catalyst easily using the fuel injector that injects the fuel into the cylinder.

In the above structure, the HC controller sets the reference amount when the temperature of the NOx catalyst is high to a value smaller than the reference amount when the temperature of the NOx catalyst is low.

In this structure, the reference amount is set to a small value when the temperature of the NOx catalyst is already high to some extent and HC is released from the HC adsorbent when a relatively small amount of HC has been stored in the HC adsorbent. Therefore, when the NOx catalyst is regenerated in the state in which the temperature of the NOx catalyst is already high, a rise in the temperature of the NOx catalyst caused by the oxidation reaction of HC released from the HC adsorbent can be kept small, thereby preventing the temperature of the NOx catalyst from being raised excessively. When the temperature of the NOx catalyst is low, the reference amount is set to a large value and the temperature of the HC adsorbent is not raised until a relatively large amount of HC is stored in the HC adsorbent. Therefore, the number of executions of control for this rise in temperature can be kept small.

In the above structure, the HC controller sets the reference amount to a constant value regardless of the temperature of the NOx catalyst when the temperature of the NOx catalyst is less than a predetermined temperature.

This can prevent the number of executions of control for raising the temperature of the HC adsorbent from being excessively increased when the temperature of the NOx catalyst is lower than a predetermined temperature.

In the above structure, the exhaust emission control device for an engine further includes a sulfur-poisoning eliminator that removes sulfur oxides (SOx) stored in the NOx catalyst from the NOx catalyst by raising the temperature of the NOx catalyst, the NOx catalyst being capable of storing SOx.

In this structure, the emission of SOx to the outside of the exhaust passage can be suppressed and an excessive rise in the temperature of the NOx catalyst by the sulfur-poisoning eliminator can be suppressed. Specifically, the temperature of the NOx catalyst in sulfur-poisoning elimination control becomes higher than in NOx catalyst regeneration control. Therefore, the temperature of the NOx catalyst is particularly raised by the oxidation reaction of a large amount of released HC, a reducing agent of the NOx catalyst is sintered, SOx thereby does not easily react with the reducing agent, and the purification performance of the NOx catalyst is reduced. In contrast, since the release of a large amount of HC from the HC adsorbent can be suppressed as described above in the disclosure, it is possible to prevent reduction in the purification performance of the NOx catalyst in sulfur-poisoning elimination control.

In the above structure, the exhaust emission control device for an engine further includes a selective catalytic reduction (SCR) catalyst provided downstream of the second purifying catalyst in the exhaust passage, the SCR catalyst purifying NOx contained in the exhaust using ammonia.

In this structure, even when NOx is removed from the NOx catalyst because the temperature of the NOx catalyst is raised due to a rise in temperature of the first purifying catalyst, the SCR catalyst can be used to purify the removed NOx. Accordingly, it is possible to prevent NOx from being discharged to the outside of the exhaust passage more reliably.

In the above structure, the first purifying catalyst and the second purifying catalyst are included in a common device and the HC adsorbent, the diesel oxidation catalyst, and the NOx catalyst are carried by a common carrier.

In this structure, a purifying device can be small-sized.

In a structure in which the amount of adsorbed HC is estimated, preferably, the amount of adsorbed HC is estimated by integrating an amount of HC adsorbed per unit time by the HC adsorbent estimated based on an amount of HC per unit time discharged from the cylinder to the exhaust passage estimated based on an operational state of the engine and an adsorbable ratio set according to a state of exhaust gas (eighth aspect).

Advantages

According to the disclosure, the purification performance of the NOx catalyst can be kept high while the amount of discharged HC is kept small.

TECHNICAL DESCRIPTION

An exhaust emission control device for an engine according to an embodiment of the disclosure will be described below with reference to the drawings.

(1) Entire Structure

Figure 1:
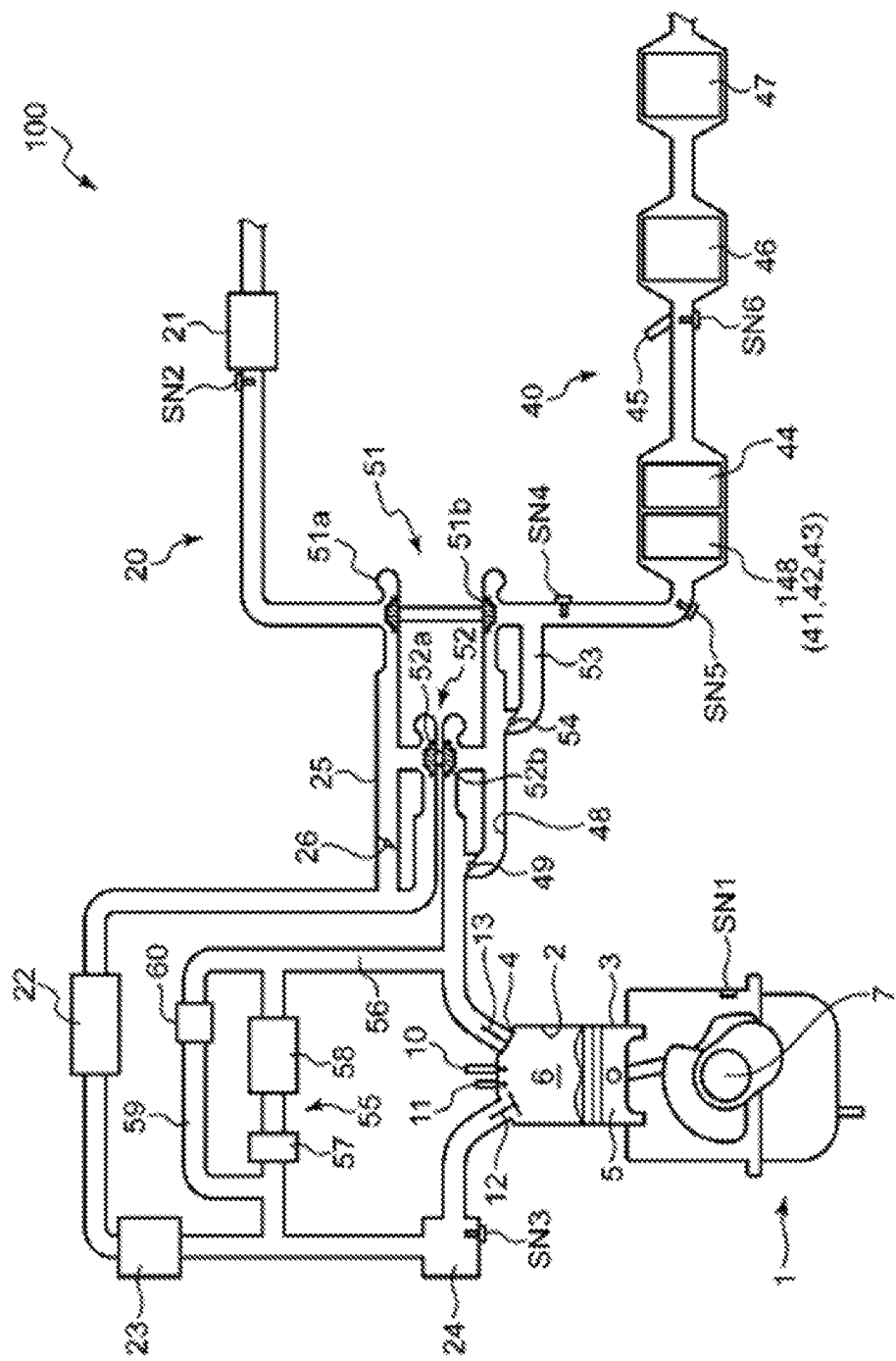
FIG. 1 is a schematic structural diagram illustrating an engine system to which an exhaust emission control device for an engine according to an embodiment of the disclosure has been applied.

FIG. 1 is a schematic structural diagram illustrating an engine system 100 to which the exhaust emission control device for an engine according to the embodiment has been applied.

The engine system 100 includes a 4-stroke engine body 1, an intake passage 20 through which air (intake air) is introduced to the engine body 1, an exhaust passage 40 through which exhaust is discharged from the engine body 1 to the outside, a first turbocharger 51, and a second turbocharger 52. This engine system 100 is provided in a vehicle and the engine body 1 is used as a driving source of the vehicle. The engine body 1 is, for example, a diesel engine and has four cylinders 2 arranged orthogonally to the sheet in FIG. 1.

The engine body 1 includes a cylinder block 3 in which the cylinders 2 are formed, a cylinder head 4 provided on an upper surface of the cylinder block 3, and pistons 5 inserted into the cylinders 2 in a reciprocally slidable manner. Combustion chambers 6 are defined above the pistons 5.

The pistons 5 are coupled to a crankshaft 7 and the crankshaft 7 rotates about a center shaft thereof according to the reciprocating motion of the pistons 5.

In each cylinder head 4, an injector (fuel injector) 10 that injects fuel into the combustion chamber 6 (cylinder 2) and a glow plug 11 for raising the temperature of an air-fuel mixture of fuel and air in the combustion chamber 6 are provided as a pair. Thus, there are a set of injectors that correspond to the cylinders 2.

In the example illustrated in FIG. 1, the injector 10 is provided at the center of the ceiling of the combustion chamber 6 so as to look down the combustion chamber 6. In addition, the glow plug 11 has a heating part that is heated when energized at the tip thereof and is mounted on the ceiling of the combustion chamber 6 so that the heating part is positioned near the tip of the injector 10. For example, the injector 10 has a plurality of nozzle holes at the tip thereof and the glow plug 11 is disposed so that the heating part thereof is positioned among a plurality of sprays from the plurality of nozzle holes of the injector 10 so as not to make direct contact with the sprays of fuel.

The injector 10 can perform main injection and post injection. Main injection is performed to obtain mainly an engine torque and injects fuel to be burnt near a compression top dead center into the combustion chamber 6. Post injection injects fuel into the combustion chamber 6 on a retarded angle side of the main injection at a time when combustion energy hardly contributes to an engine torque if combustion occurs.

The cylinder head 4 is provided with intake ports through which air is introduced from the intake passage 20 to the combustion chambers 6 (cylinders 2), intake valves 12 that open and close the intake ports, exhaust ports through which exhaust generated in the combustion chambers 6 (cylinders 2) is introduced to the exhaust passage 40, and exhaust valves 13 that open and close the exhaust ports.

The intake passage 20 is provided with, sequentially from the upstream side, an air cleaner 21, a compressor 51*a* (referred to below as the first compressor 51*a* as appropriate) of the first turbocharger 51, a compressor 52*a* (referred to below as the second compressor 52*a* as appropriate) of the second turbocharger 52, an intercooler 22, a throttle valve 23, and a surge tank 24. In addition, the intake passage 20 is provided with an intake side bypass passage 25 that bypasses the second compressor 52*a* and an intake side bypass valve 26 that opens and closes this passage. A driving device (not illustrated) switches the intake side bypass valve 26 between a fully open state and a fully closed state.

The exhaust passage 40 is provided with, sequentially from the upstream side, a turbine 52*b* (referred to below as the second turbine 52*b* as appropriate) of the second turbocharger 52, a turbine 51*b* (referred to below as the first turbine 51*b* as appropriate) of the first turbocharger 51, a composite catalyst device 148, a diesel particulate filter (DPF) 44, a urea injector 45, a selective catalytic reduction (SCR) catalyst 46, and a slip catalyst 47.

The DPF 44 collects PM (particulate matter) in exhaust. The PM collected by the DPF 44 is burnt by receiving oxygen at a high temperature and then removed from the DPF 44.

The urea injector 45 is a device that injects urea into the part of the exhaust passage 40 downstream of the DPF 44. The urea injector 45 is connected to a urea tank (not illustrated) in which urea is stored and injects urea supplied from this urea tank into the exhaust passage 40.

The SCR catalyst 46 is a catalyst device that selectively reduces NOx contained in exhaust using ammonia. The urea injected from the urea injector 45 undergoes hydrolytic degradation by the SCR catalyst 46 and is converted to ammonia. The SCR catalyst 46 adsorbs the ammonia generated from the urea. In addition, ammonia may be released from a NOx catalyst 41 as described later and the SCR catalyst 46 also adsorbs the ammonia released from the NOx catalyst 41. Then, the SCR catalyst 46 reduces NOx by causing the adsorbed ammonia to react with NOx contained in exhaust. The SCR catalyst 46 is formed by, for example, carrying, on the cell wall of a honeycomb carrier, catalyst components formed by carrying catalyst metal (such as Fe, Ti, Ce, or W) that reduces NOx via ammonia by zeolite that traps ammonia.

The slip catalyst 47 performs purification by oxidizing unreacted ammonia discharged from the SCR catalyst 46. That is, since the amount of ammonia that can be adsorbed by the SCR catalyst 46 is limited, the slip catalyst 47 purifies ammonia passing through the SCR catalyst 46.

The composite catalyst device 148 includes the NOx catalyst 41 for purifying NOx, a diesel oxidation catalyst (DOC) 42, and an HC adsorbent 43.

As described above, a purifying device (second purifying catalyst) including the NOx catalyst 41 and a purifying device (first purifying catalyst) including the diesel oxidation catalyst 42 and the HC adsorbent 43 are configured as a common device in the embodiment, and the NOx catalyst 41, the diesel oxidation catalyst 42, and the HC adsorbent 43 are carried by a common carrier.

The diesel oxidation catalyst 42 oxidizes a hydrocarbon (HC) (that is, unburnt fuel), carbon monoxide (CO), and the like using oxygen in exhaust to convert them to water and carbon dioxide. Since this oxidation reaction caused in the diesel oxidation catalyst 42 is an exothermic reaction, the oxidation reaction caused in the diesel oxidation catalyst 42 raises the temperature of exhaust.

The HC adsorbent 43 adsorbs HC in exhaust at a temperature lower than a predetermined temperature (e.g. 150° C., or less such as 100° C., or lower) and releases adsorbed HC that is HC adsorbed by the adsorbent at the predetermined temperature or higher (e.g. 250° C., or more such as 280° C., or higher). The HC adsorbent 43 includes crystals made of zeolite having many small holes. HC is adsorbed by these small holes when the temperature of the HC adsorbent 43 is low and adsorbed HC oscillates and is ejected from these small holes when the temperature of the HC adsorbent 43 is high.

Since the HC adsorbent 43 is provided, it is possible to keep the amount of HC released to the outside of the exhaust passage 40 during cold start of the engine small in the embodiment. Specifically, since the temperature of the HC adsorbent 43 is kept low during cold start of the engine, the HC adsorbent 43 can adsorb HC discharged from the engine body 1 and the emission of HC to the outside can be suppressed. The HC adsorbed by the HC adsorbent 43 as described above is released from the HC adsorbent 43 when the engine body 1 is operated normally, the temperature of exhaust is raised, and the temperature of the HC adsorbent 43 is thereby raised. The HC released from the HC adsorbent 43 is oxidized by the diesel oxidation catalyst 42 and output to the outside as $H_2O$, $CO_2$, and the like. The diesel oxidation catalyst 42 includes catalyst metal such as platinum or palladium.

The NOx catalyst 41 is a NOx storage catalyst (NSC). The NOx catalyst 41 stores NOx contained in exhaust in a lean state in which the air-fuel ratio A/F of exhaust, which is the ratio of A (air (oxygen) included in exhaust gas) to F (fuel (H) included in exhaust gas), is larger than a theoretical air-fuel ratio ($\lambda>1$ where $\lambda$ is excess air ratio of exhaust) and reduces the stored NOx in the state in which the air-fuel ratio of exhaust is close to the theoretical air-fuel ratio ($\lambda=1$) or in a rich state in which the air-fuel ratio is smaller than the theoretical air-fuel ratio ($\lambda<1$), that is, in a reducing atmosphere in which exhaust passing through the NOx catalyst 41 includes large amounts of unburnt HC or CO.

More specifically, the NOx catalyst 41 includes noble metal such as platinum (Pt) functioning as an oxidation-reduction agent and a storage material, made of a basic material such as Ba (barium), that adsorbs NOx. In the lean state in which the air-fuel ratio of exhaust is larger than the theoretical air-fuel ratio ($\lambda>1$), NO in exhaust is oxidized by the oxidation-reduction agent, is converted to $NO_2$, and $NO_2$, is stored in the storage material as nitrate salt. For example, when the storage material is Ba, the NOx catalyst 41 stores NOx as $Ba(NO_3)_2$ or the like. On the other hand, a reduction agent such as HC or CO is supplied to the NOx catalyst 41, the nitrate salt is reduced and $NO_2$ is generated. That is, NOx is removed from the storage material. In addition, the removed $NO_2$ reacts with HC or CO, $NO_2$ is reduced to generate $N_2$, and $N_2$ is discharged from the NOx catalyst 41.

When a large amount of HC is introduced to the NOx catalyst 41, although NOx stored in the storage material is mainly converted to $N_2$, part of NOx (part of N (nitrogen) included in NOx) reacts with HC in exhaust to form $NH_3$. Then, the generated $NH_3$ (that is, ammonia) is released from the NOx catalyst 41.

It should be noted here that, since no devices for supplying air or fuel are disposed separately in the exhaust passage 40 in the embodiment, the air-fuel ratio of exhaust corresponds to the air-fuel ratio of the air-fuel mixture in the combustion chamber 6. That is, when the air-fuel ratio of the air-fuel mixture in the combustion chamber 6 is larger than the theoretical air-fuel ratio, the air-fuel ratio of exhaust is also larger than the theoretical air-fuel ratio. In contrast, when the air-fuel ratio of the air-fuel mixture in the combustion chamber 6 is close to or smaller than the theoretical air-fuel ratio, the air-fuel ratio of exhaust is also close to or smaller than the theoretical air-fuel ratio.

Figure 2:
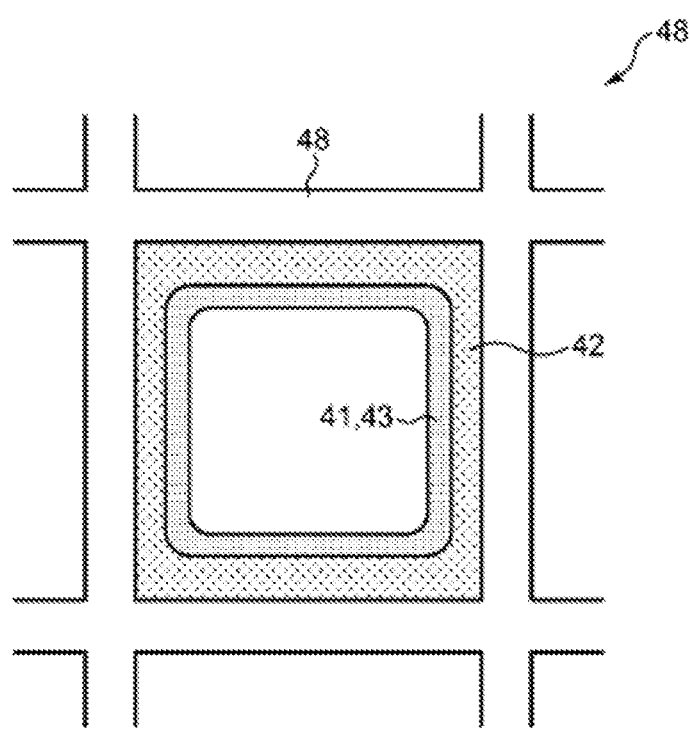
FIG. 2 is a diagram partially enlarging a composite catalyst device.

FIG. 2 is a partially enlarged view illustrating an example of the composite catalyst device 148. The composite catalyst device 148 includes a carrier 48a of a honeycomb structure made of, for example, cordierite, the diesel oxidation catalyst 42 is carried on the wall surfaces of through-holes formed in the carrier 48a, and the surface of the diesel oxidation catalyst 42 is coated with the NOx catalyst 41 and the HC adsorbent 43.

The NOx catalyst 41 stores (adsorbs) SOx in addition to NOx. Specifically, in the lean state in which the air-fuel ratio of exhaust is larger than the theoretical air-fuel ratio ($\lambda>1$), SOx in exhaust is stored by the storage material of the NOx catalyst 41 while being oxidized by the oxidation-reduction agent included in the NOx catalyst 41. The SOx stored in the NOx catalyst 41 is reduced in the state in which the air-fuel ratio of exhaust is close to the theoretical air-fuel ratio ($\lambda=1$) or in the rich state in which the air-fuel ratio of exhaust is smaller than the theoretical air-fuel ratio ($\lambda<1$).

Although both the SCR catalyst 46 and the NOx catalyst 41 can purify NOx, the temperatures at which the purification ratios (NOx storage ratios) thereof increase are different from each other. The NOx purification ratio (NOx storage ratio) of the SCR catalyst 46 is large when the temperature of exhaust is relatively high and the NOx purification ratio of the NOx catalyst 41 is large when the temperature of exhaust is relatively low.

The exhaust passage 40 is provided with an exhaust side bypass passage 48 that bypasses the second turbine 52b, an exhaust side bypass valve 49 that opens and closes the exhaust side bypass passage 48, a waste gate passage 53 that bypasses the first turbine 51b, and a waste gate valve 54 that opens and closes the waste gate passage 53. Driving devices (not illustrated) switch the exhaust side bypass valve 49 and the waste gate valve 54 between the fully open state and the fully closed state and set any opening degree between these states.

The engine system 100 according to the embodiment has an EGR device 55 that flows back a part of exhaust to intake air. The EGR device 55 has an EGR passage 56 that makes connection between a part of the exhaust passage 40 upstream of the upstream end of the exhaust side bypass passage 48 and a part of the intake passage 20 between the throttle valve 23 and the surge tank 24, a first EGR valve 57 that opens and closes the EGR passage 56, and an EGR cooler 58 that cools exhaust passing through the EGR passage 56. In addition, the EGR device 55 has an EGR cooler bypass passage 59 that bypasses the EGR cooler 58 and a second EGR valve 60 that opens and closes the EGR cooler bypass passage 59.

(2) Control System

Figure 3:
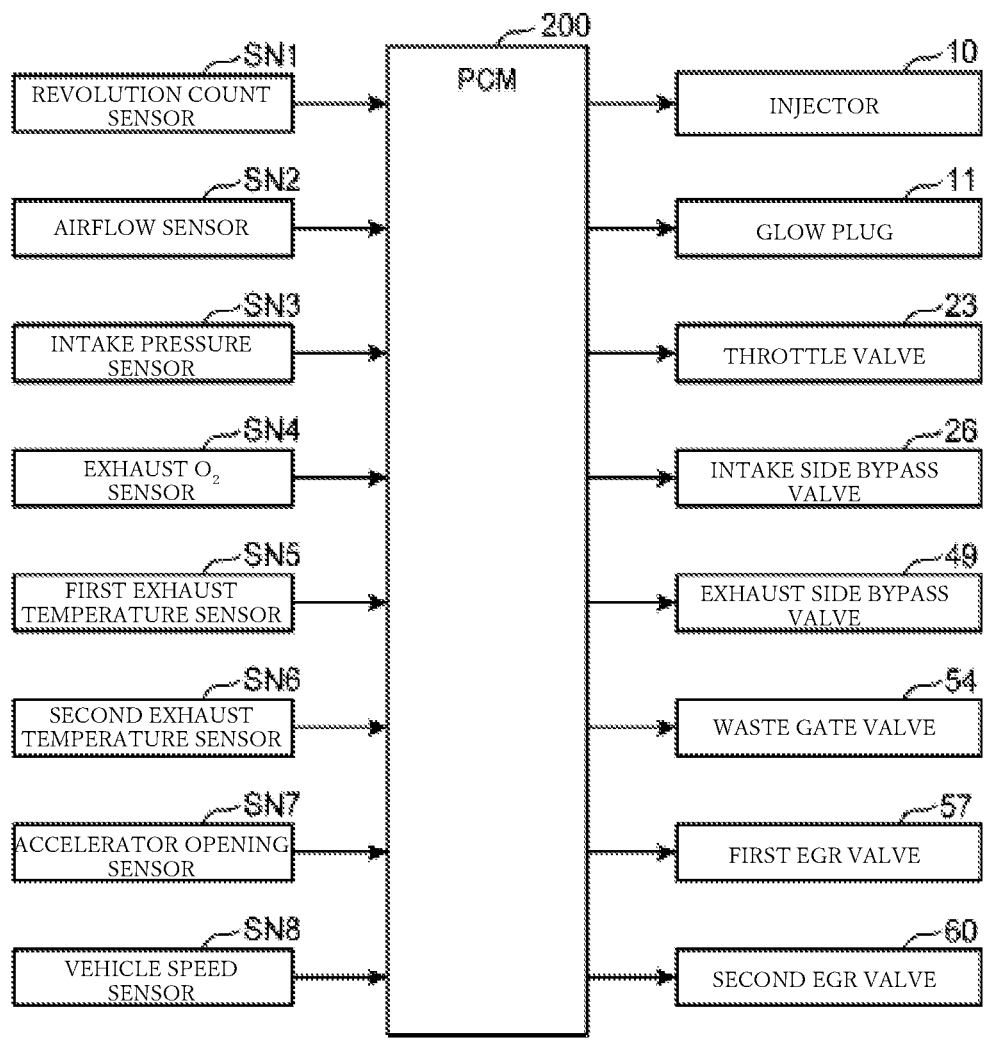
FIG. 3 is a block diagram illustrating a control system of the engine system.

A control system of the engine system will be described with reference to FIG. 3. The engine system 100 according to the embodiment is controlled mainly by a power train control module (controller, PCM, circuit or circuitry) 200 installed in the vehicle. The PCM 200 is a microprocessor including a CPU, a ROM, a RAM, an interface, and the like.

The PCM 200 receives information from various sensors. For example, the PCM 200 is electrically connected to a revolution count sensor SN1 that detects the number of revolutions of the crankshaft 7 (that is, the number of engine revolutions), an airflow sensor SN2, provided in the vicinity of the air cleaner 21, that detects an intake air amount that is the amount of intake air (air) passing through the intake passage 20, an intake pressure sensor SN3, provided in the surge tank 24, that detects the pressure (that is, the supercharging pressure) of intake air in the surge tank 24 after being supercharged by the turbochargers 51 and 52, an exhaust $O_2$ sensor SN4 that detects the oxygen concentration of the part of the exhaust passage 40 between the first turbocharger 51 and the composite catalyst device 148, a first exhaust temperature sensor SN5 provided immediately upstream of the NOx catalyst 41, a second exhaust temperature sensor SN6 provided immediately upstream of the SCR catalyst 46, and the like and receives input signals from these sensors SN1 to SN6. In addition, the vehicle is provided with an accelerator opening sensor SN7 that detects an accelerator opening that is the opening of an accelerator pedal (not illustrated) operated by the driver, a vehicle speed sensor SN8 that detects a vehicle speed, and the like and the detection signals of these sensors SN7 and SN8 are also input to the PCM 200. The PCM 200 performs various operations based on input signals from the sensors (such as SN1 to SN8) and controls the injector 10 and the like.

(2-1) Normal Control

In normal control to be performed in normal operation that does not perform DeNOx control, DeSOx control, adsorbed HC release control, or DPF regeneration control that will be described later, the air-fuel ratio (referred to below briefly as the air-fuel ratio of an air-fuel mixture) of the air-fuel mixture in the combustion chamber 6 is made leaner than the theoretical air-fuel ratio to improve fuel economy performance. That is, the excess air ratio λ of the air-fuel mixture meets λ>1. For example, the excess air ratio λ of the air-fuel mixture in normal control is approximately 1.7. In normal control, post injection is stopped and only main injection is performed.

In normal control, the PCM 200 first calculates a requested engine torque (engine load), which is the torque requested for an engine, based on the accelerator opening detected by the accelerator opening sensor SN7, the number of engine revolutions detected by the revolution count sensor SN1, and the like. Next, the PCM 200 sets a target main injection amount, which is the target value of the injection amount of main injection, so as to achieve the requested engine torque based on the requested engine torque, the number of engine revolutions, and the like. Then, the PCM 200 drives the injector 10 so that the target main injection amount of fuel is injected into the combustion chamber 6 by main injection.

In Normal Control, the Operation of the Glow Plug 11 is stopped. In addition, in normal control, the first EGR valve 57, the second EGR valve 60, the intake side bypass valve 26, the exhaust side bypass valve 49, and the waste gate valve 54 are controlled so that the amount of EGR gas and the supercharging pressure have appropriate values according to the operational state of the engine body 1 such as, for example, the number of engine revolutions and the engine load.

(2-2) DeNOx Control

Next, the following describes DeNOx control for regenerating the NOx catalyst 41 by removing NOx (referred to below as stored NOx as appropriate) stored in the NOx catalyst 41 from the NOx catalyst 41 and reducing and discharging the removed NOx.

The PCM 200 performs DeNOx control when a condition including a condition that the amount of stored NOx is equal to or more than a preset first reference stored NOx amount.

In the embodiment, by performing post injection while raising the temperature of the NOx catalyst 41 to reduce the air-fuel ratios of the air-fuel mixture and exhaust to values close to the theoretical air-fuel ratio or less and discharge NOx from the NOx catalyst 41 while reducing NOx. That is, the PCM 200 sets the air-fuel ratio of exhaust to the DeNOx control air-fuel ratio, close to or smaller than the theoretical air-fuel ratio, that enables the NOx catalyst 41 to reduce and discharge NOx by causing the injector 10 to perform post injection in addition to main injection as DeNOx control. In the embodiment, the DeNOx air-fuel ratio is set to a value obtained by dividing the DeNOx air-fuel ratio by the theoretical air-fuel ratio (DeNOx air-fuel ratio/theoretical air-fuel ratio) in which an excess air ratio λ corresponding to the DeNOx air-fuel ratio is approximately 0.96 to 1.04. That is, the excess air ratio λ of exhaust is approximately 0.96 to 1.04 in DeNOx control.

When post injection is performed, the temperature of the NOx catalyst 41 raised. Specifically, as described later, active DeNOx control that performs post injection at the time when fuel is burnt in the combustion chamber 6 and passive DeNOx control that performs post injection at the time when fuel is not burnt in the combustion chamber 6 are performed in the embodiment. When fuel having undergone post injection is burnt in the combustion chamber 6, the temperature of exhaust flowing to the NOx catalyst 41 is raised, thereby raising the temperature of the NOx catalyst 41. In addition, when fuel having undergone post injection is discharged without being burnt in the combustion chamber 6, the unburnt fuel is oxidized by the diesel oxidation catalyst 42 and the temperature of exhaust is raised, thereby raising the temperature of the NOx catalyst 41.

As described above, in the embodiment, the injector 10 that performs post injection and the PCM 200 that controls the injector 10 mainly function as the NOx catalyst regenerator that regenerates the NOx catalyst 41 while raising the temperature thereof.

Figure 4:
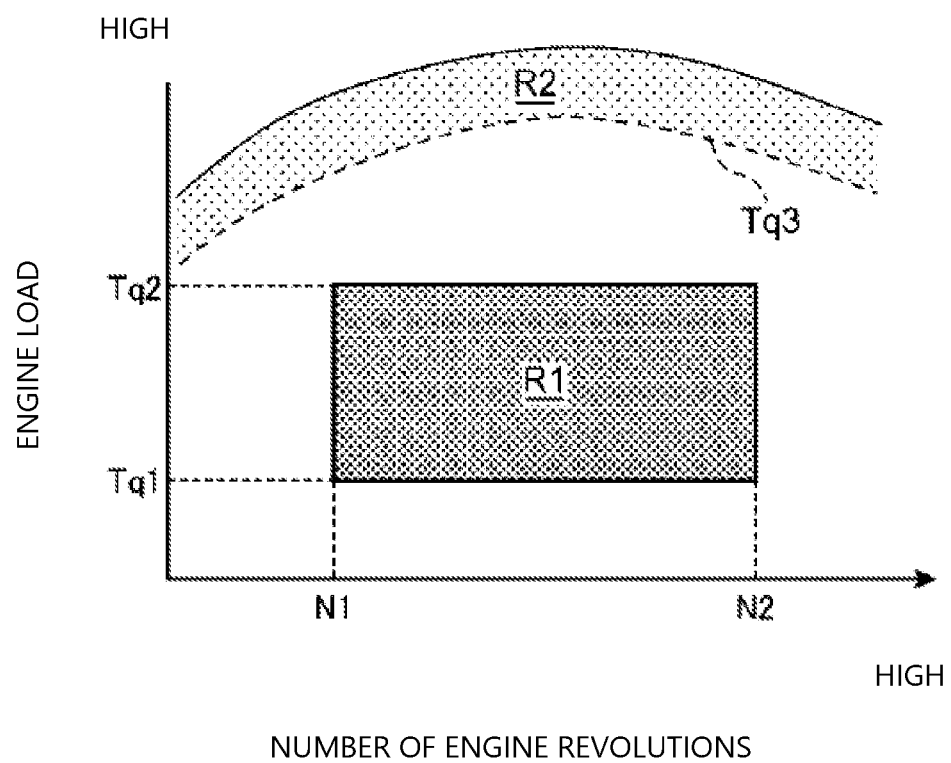
FIG. 4 is a diagram illustrating regions in which DeNOx control is performed.

In the embodiment, DeNOx control is performed only in a first region R1 and a second region R2 illustrated in FIG. 4. In the first region R1, the number of engine revolutions is equal to or more than a preset first reference number of revolutions N1 and equal to or less than a preset second reference number of revolutions N2 (>N1) and the engine load is equal to or higher than a preset first reference load Tq1 and equal to or lower than a preset second reference load Tq2 (>Tq1). In the second region R2, the engine load is higher than in the first region R1 and the engine load is equal to or higher than a preset third reference load Tq3 (>Tq2).

In the first region R1, the PCM 200 performs active DeNOx control that performs post injection at the time when fuel having undergone post injection is burnt in the combustion chamber 6. The execution time of post injection is preset to, for example, timing from 30 to 70° C.A after the compression top dead center in the first half of an expansion stroke. In the embodiment, when active DeNOx control is performed, the air-fuel mixture is heated by energizing the glow plug 11 to promote burning of the fuel having undergone post injection.

In active DeNOx control, the opening of the first EGR valve 57 and the opening of the second EGR valve 60 are made smaller (to be in a close side) than in normal operation while EGR gas is introduced to the combustion chamber 6 to promote burning of the fuel having undergone post injection and keep the amount of soot generated by the burning small. That is, the openings of these EGR valves 57 and 60 are made smaller than the openings when active DeNOx control is not performed. For example, in active DeNOx control, the first EGR valve 60 is fully closed and the second EGR valve 57 is opened with an opening smaller than in normal operation.

In contrast, in the second region R2, the PCM 200 performs passive DeNOx control that performs post injection at the time when fuel having undergone post injection is not burnt in the combustion chamber 6. The execution time of the post injection is preset to, for example, timing of approximately 110° C.A after the compression top dead center in the second half of an expansion stroke. In passive DeNOx control, the first EGR valve 57 and the second EGR valve 60 are fully closed to prevent the EGR cooler 58 and the like from being blocked by deposits caused by unburnt fuel.

Active DeNOx control is performed in the first region R1 and passive DeNOx control is performed in the second region R2 because of the following reasons.

Since fuel having undergone post injection is not burnt in passive DeNOx control that performs post injection at the time when fuel is not burnt in the combustion chamber 6, generation of soot caused by this fuel is suppressed, but deposits caused by unburnt fuel are easily generated. In addition, unburnt fuel is mixed with engine oil through the clearance between the piston 5 and the cylinder block 3, easily causing oil dilution. In contrast, although generation of deposits and oil dilution are suppressed in active DeNOx control that performs post injection at the time when fuel is burnt in the combustion chamber 6, soot is easily increased.

Since the amount of main injection is large when the engine load is very high, the air-fuel ratio of the air-fuel mixture is reduced to a relatively small value only by main injection. Therefore, when the engine load is very high, soot is likely to be generated only by main injection. Accordingly, when soot caused by post injection is also generated at this time, the amount of soot discharged from the vehicle may become excessive. In addition, since the air-fuel ratio of the air-fuel mixture is reduced to a relatively small value only by main injection as described above when the engine load is very high, the amount of post injection required to reduce the air-fuel ratios of the air-fuel mixture and exhaust to values close to or smaller than the theoretical air-fuel ratio can be kept small. Therefore, the amount of deposits generated and the amount of fuel mixed with engine oil can be reduced to small values even when performing post injection at the time when fuel is not burnt in the combustion chamber 6.

Therefore, passive DeNOx control is performed in the second region in which the engine load is very high in the embodiment.

In contrast, when the engine load is relatively low, soot is not easily generated only by performing main injection unlike the case in which the engine load is very high. The amount of post injection required to reduce the air-fuel ratios of the air-fuel mixture and exhaust to values close to or smaller than the theoretical air-fuel ratio easily increases and, if post injection is performed at the time when fuel is not burnt in the combustion chamber 6, the amount of deposits generated and the amount of fuel mixed with engine oil easily increase.

Therefore, active DeNOx control is performed in the region in which the engine load is low in the embodiment.

However, in a region in which the engine load is very low or the number of engine revolutions is small, the temperature of the NOx catalyst 41 easily becomes lower than the temperature above which adsorbed NOx can be reduced when the temperature of exhaust is low. In addition, when the engine load is lower than in the second region R2 but not sufficiently low or when fuel is not sufficiently mixed with air since the engine load is low but the number of engine revolutions is large and soot is easily generated, the amount of soot is relatively large if post injection is performed at the time when fuel is burnt in the combustion chamber 6 and the amount of deposits and the amount of fuel mixed with engine oil become relatively large if post injection is performed at the time when fuel is not burnt in the combustion chamber 6.

Therefore, in the embodiment, active DeNOx control is performed only in the first region R1 in which both the engine load and the number of engine revolutions are not too small and not too high, of the regions in which the engine load is lower than the second region R2.

Figure 5:
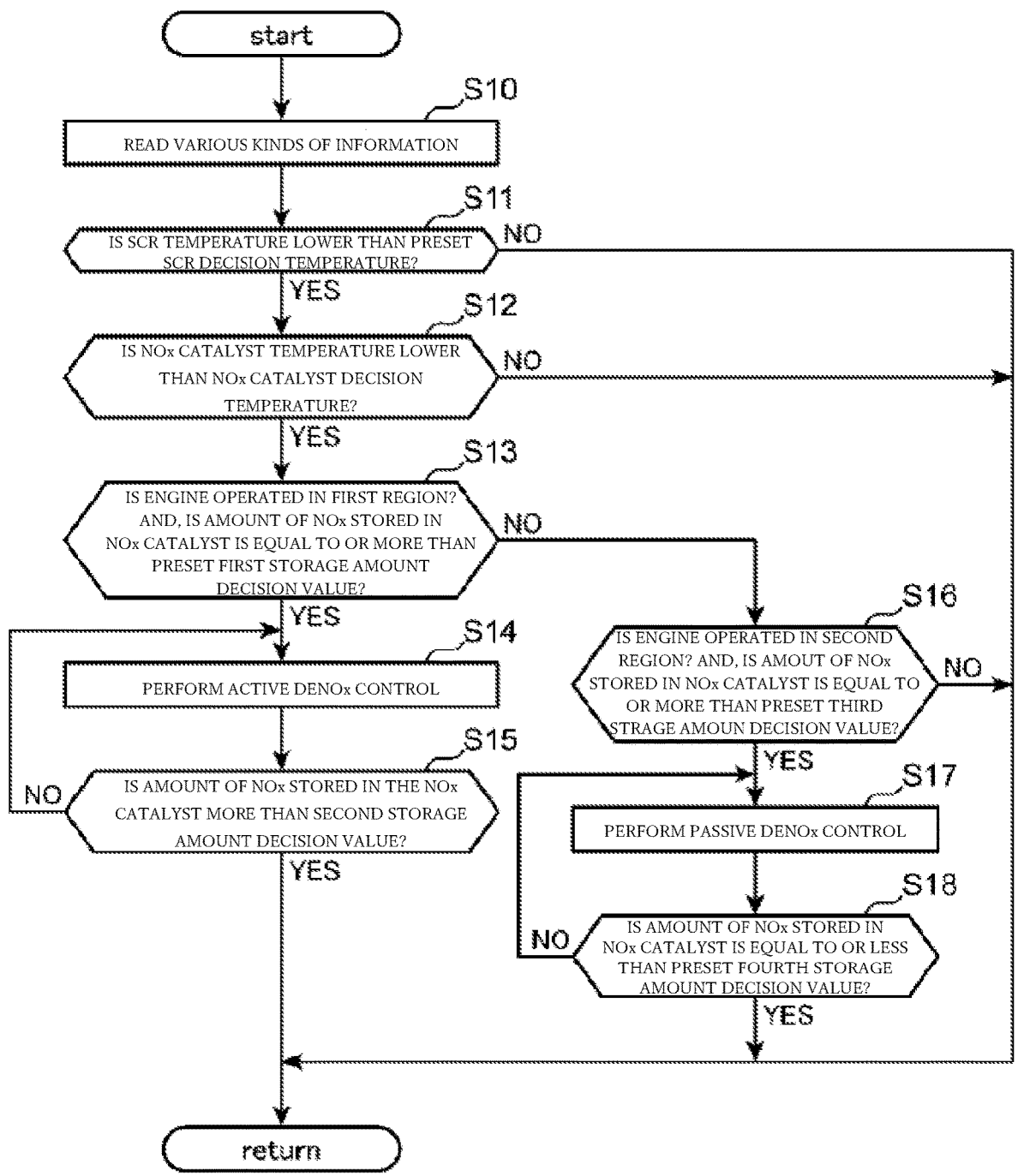
FIG. 5 is a flowchart illustrating a flow of DeNOx control.

A flow of DeNOx control will be described with reference to the flowchart in the FIG. 5.

First, in step S10, the PCM 200 reads various kinds of information of a vehicle. The PCM 200 reads at least a NOx catalyst temperature, which is the temperature of the NOx catalyst 41, an SCR temperature, which is the temperature of the SCR catalyst 46, and an amount of stored NOx, which is the amount of NOx stored in the NOx catalyst 41. The NOx catalyst temperature is estimated based on the detection value of, for example, the first exhaust temperature sensor SN5. Instead of this, the NOx catalyst temperature may be estimated based on the detection value of a temperature sensor provided between the NOx catalyst 41 and the DPF 44. In addition, the SCR temperature is estimated based on the detection value of the second exhaust temperature sensor SN6. In addition, the amount of stored NOx is estimated by estimating the amount of NOx contained in exhaust based on the number of engine revolutions, the engine load, the flow rate of exhaust, the temperature of exhaust, and the like and integrating the amount of NOx.

Next, in step S11, the PCM 200 decides whether the SCR temperature is lower than a preset SCR decision temperature. The SCR decision temperature is the lower limit value of the temperature of the SCR catalyst 46 at or above which the SCR catalyst 46 can purify NOx.

When the decision in step S11 is NO, that is, the SCR temperature is equal to or higher than the SCR decision temperature, since the SCR catalyst 46 can purify NOx, the PCM 200 ends the processing without performing DeNOx control (the processing returns to step S10).

In contrast, when the decision in step S11 is YES, that is, the SCR temperature is lower than the SCR decision temperature, the processing proceeds to step S12. In step S12, the PCM 200 decides whether the NOx catalyst temperature is equal to or higher than a preset NOx catalyst decision temperature. The NOx catalyst decision temperature is the lower limit value of the temperature of the NOx catalyst 41 at or above which the NOx catalyst 41 can reduce NOx (can remove NOx from the NOx catalyst 41).

When the decision in step S12 is NO, that is, the NOx catalyst temperature is lower than the NOx catalyst decision temperature, NOx cannot be reduced even if DeNOx control is performed. Accordingly, when the decision in step S12 is NO, the processing ends without performing DeNOx control (the processing returns to step S10).

In contrast, when the decision in step S12 is YES, that is, the NOx catalyst temperature is equal to or higher than the NOx catalyst decision temperature, the processing proceeds to step S13.

In step S13, the PCM 200 decides whether the engine is operated in the first region R1 and the amount of NOx stored in the NOx catalyst 41 is equal to or more than a preset first storage amount decision value. In the embodiment, the first storage amount decision value is set to a value close to the maximum value of the amount of NOx that can be stored in the NOx catalyst 41 (for example, about two-thirds of the maximum value). It should be noted here that this first storage amount decision value may be changed according to the travel distance after active DeNOx control was performed last time or the like.

When the decision in step S13 is YES, that is, the engine is operated in the first region R1 and the amount of NOx stored in the NOx catalyst 41 is equal to or more than the first storage amount decision value, the PCM 200 proceeds to step S14 and performs active DeNOx control.

After step S14, the processing proceeds to step S15 and the PCM 200 decides whether the amount of NOx stored in the NOx catalyst 41 is equal to or less than a preset second storage amount decision value. The second storage amount decision value is set to a value less than the first storage amount decision value, for example, a value close to 0.

When the decision in step S15 is NO, that is, the amount of NOx stored in the NOx catalyst 41 is more than the second storage amount decision value, the processing returns to step 14. In contrast, when the decision in step S15 is YES, that is, the amount of NOx stored in the NOx catalyst 41 is equal to or less than the second storage amount decision value, the processing ends (the PCM 200 stops active DeNOx control and returns to step S10). That is, basically, active DeNOx control is continuously performed until the amount of NOx stored in the NOx catalyst 41 is reduced to the second storage amount decision value or less in the embodiment. However, although not illustrated in the drawing, even when the amount of NOx stored in the NOx catalyst 41 is not yet reduced to the second storage amount decision value or less, active DeNOx control is stopped when the decision in step S11 is NO or the decision in step S12 is NO. In addition, when the operation region of the engine deviates from the first region R1, active DeNOx control is also stopped.

The processing returns to step S13. When the decision in step S13 is NO, that is, the engine is not operated in the first region R1 or the amount of NOx stored in the NOx catalyst 41 is less than the first storage amount decision value, the processing proceeds to step S16.

In step S16, the PCM 200 decides whether the engine is operated in the second region R2 and the amount of NOx stored in the NOx catalyst 41 is equal to or more than a preset third storage amount decision value. The third storage amount decision value is set to a value less than the first storage amount decision value. For example, the third storage amount decision value is set to about one third of the maximum value of the amount of NOx that can be stored in the NOx catalyst 41.

When the decision in step S16 is YES, that is, the engine is operated in the second region R2 and the amount of NOx stored in the NOx catalyst 41 is equal to or more than the third storage amount decision value, the PCM 200 proceeds to step S17 and performs passive DeNOx control. Instead of the operation in this example, even when the decision in step S16 is YES, passive DeNOx control does not need to be performed when the execution frequency of passive DeNOx control is high. In addition, even when the decision in step S16 YES, if the injection amount of post injection reduced to a value less than a predetermined amount and it is clear that the effect of reduction of NOx by post injection is small (if oil dilution caused by post injection is more serious), passive DeNOx control does not need to be performed.

After step S17, the processing proceeds to step S18, the PCM 200 decides whether the amount of NOx stored in the NOx catalyst 41 is equal to or less than a preset fourth storage amount decision value. The fourth storage amount decision value is set to a value less than the third storage amount decision value, for example, a value close to 0.

When the decision in step S18 is NO, that is, the amount of NOx stored in the NOx catalyst 41 is more than the fourth storage amount decision value, the processing returns to step 17. In contrast, when the decision in step S18 is YES, that is, the amount of NOx stored in the NOx catalyst 41 is equal to or less than the fourth storage amount decision value, the processing ends (the PCM 200 stops passive DeNOx control and returns to step S10). That is, basically, passive DeNOx control is continuously performed until the amount of NOx stored in the NOx catalyst 41 is reduced to the fourth storage amount decision value or less in the embodiment. However, although not illustrated in the drawing, even when the amount of NOx stored in the NOx catalyst 41 is not yet reduced to the fourth storage amount decision value or less, passive DeNOx control is stopped when the decision in step S11 is NO or the decision in step S12 is NO. In addition, when the operation region of the engine deviates from the second region R2, passive DeNOx control is also stopped.

In contrast, when the decision in step S16 is NO, that is, the engine is not operated in the second region R2 or the amount of NOx stored in the NOx catalyst 41 is less than the third storage amount decision value, the processing ends without performing DeNOx control (the processing returns to step S10).

(2-3) DeSOx Control

Next, DeSOx control for reducing and removing SOx (referred to below as stored SOx as appropriate) stored in the NOx catalyst 41 will be described.

Stored SOx is reduced in the state in which the air-fuel ratio of exhaust is close to the theoretical air-fuel ratio ($\lambda=1$) or in the rich state in which the air-fuel ratio of exhaust is smaller than the theoretical air-fuel ratio ($\lambda<1$), as described above. Therefore, main injection as well as post injection is performed also in DeSOx control to achieve the state in which the air-fuel ratio of the air-fuel mixture is close to the theoretical air-fuel ratio ($\lambda=1$) or the rich state in which the air-fuel ratio of the air-fuel mixture is smaller than the theoretical air-fuel ratio ($\lambda<1$).

However, since the binding force of SOx is stronger than that of NOx, the temperature of the NOx catalyst 41 needs to be made higher (approximately 600° C.) than in DeNOx control to reduce stored SOx.

Figure 6:
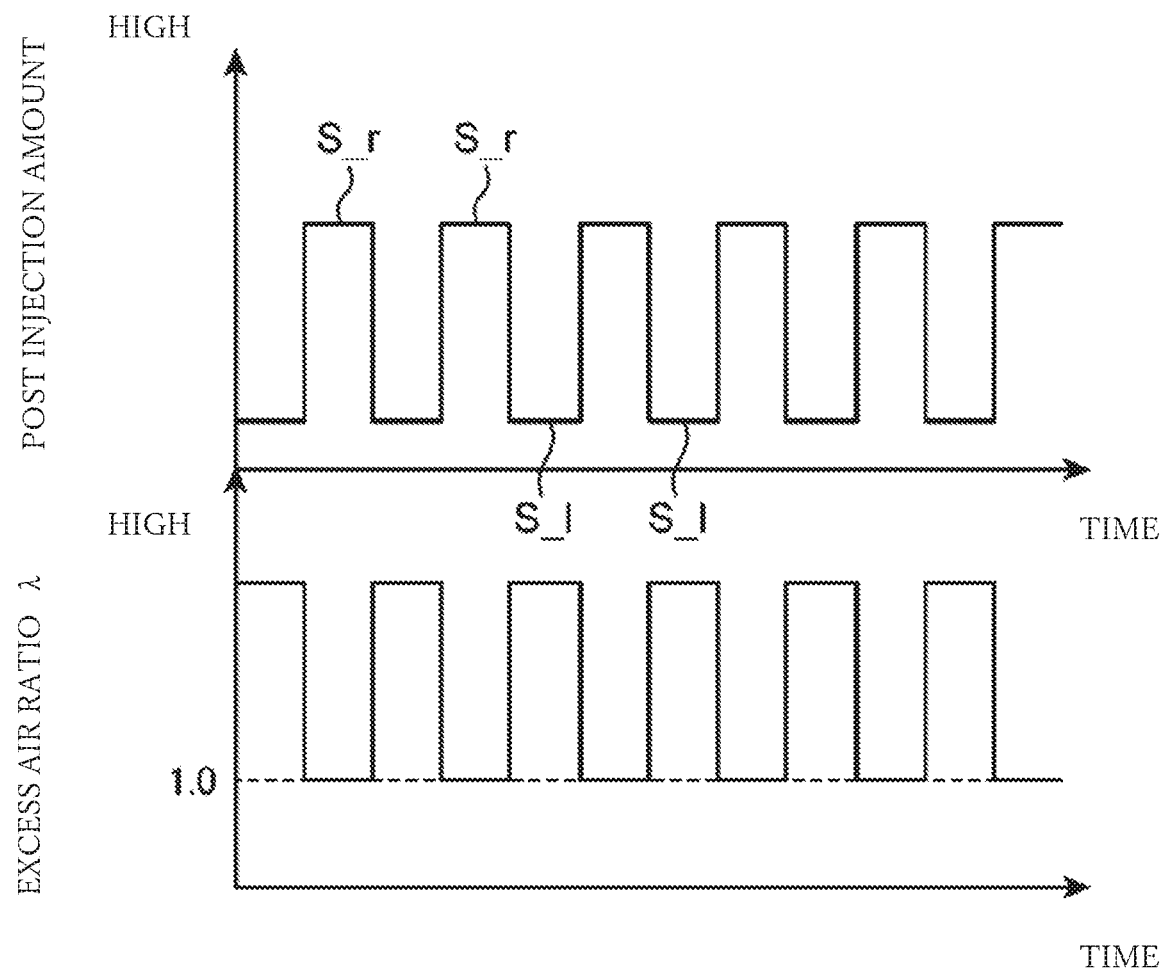
FIG. 6 is a diagram schematically illustrating temporal changes in a post injection amount and temporal changes in an excess air ratio of exhaust during execution of DeSOx control.

Therefore, the embodiment performs DeSOx control that alternately executes a rich step S_r that makes the air-fuel ratio of exhaust close to or smaller than the theoretical air-fuel ratio by performing post injection as in DeNOx control and a lean step S_l that supplies air and unburnt fuel to the diesel oxidation catalyst 42 by performing post injection while making the air-fuel ratio of exhaust leaner than the theoretical air-fuel ratio and oxidizes the air and unburnt fuel using the diesel oxidation catalyst 42 as illustrated in FIG. 6 in order to make the air-fuel ratio in the NOx catalyst 41 close to or smaller than the theoretical air-fuel ratio while raising the temperature of the NOx catalyst 41 by an oxidation reaction using the diesel oxidation catalyst 42. FIG. 6 schematically illustrates temporal changes in the post injection amount and temporal changes in the excess air ratio of exhaust during execution of DeSOx control.

In the rich step S_r, as in active DeNOx control, at the time (for example, 30 to 70° C.A after the compression top dead center in the first half of the expansion stroke) when fuel having undergone post injection is burnt in the combustion chamber 6, post injection is performed. In addition, in the embodiment, the excess air ratio $\lambda$ of exhaust is assumed to be approximately 0.94 to 1.06 in a rich step D r. In the example in FIG. 6, the air-fuel ratio of exhaust is assumed to be the theoretical air-fuel ratio (excess air ratio $\lambda=1$) in the rich step S_r. At this time, the throttle valve 23, the exhaust side bypass valve 49, and the waste gate valve 54 are controlled so that the amounts of intake air thereof are smaller than in normal operation. In addition, in the rich step S_r, the first EGR valve 57 is fully closed and the second EGR valve 60 is opened with the opening thereof smaller than in normal operation.

In contrast, in the lean step S_l, post injection is performed at the time (for example, 110° C.A after the compression top dead center in the second half of the expansion stroke) when fuel having undergone post injection is not burnt in the combustion chamber 6. In addition, the excess air ratio $\lambda$ of exhaust is assumed to be approximately 1.2 to 1.4 in the lean step S_l in the embodiment. It should be noted here that the first EGR valve 57 and the second EGR valve 60 are fully closed in the lean step S_l. By reacting fuel having undergone post injection with the diesel oxidation catalyst in the lean step S_l, the temperature of the NOx catalyst 41 can be kept at a temperature at which SOx can be removed.

It should be noted here that DeSOx control is performed when the NOx catalyst temperature is equal to or higher than the NOx catalyst decision temperature.

Since SOx is removed from the NOx catalyst 41 by performing post injection in the embodiment as described above, the injector 10 that performs post injection and the PCM 200 that controls the injector 10 mainly function as the sulfur-poisoning eliminator that raises the temperature of the NOx catalyst 41 and removes SOx stored in the NOx catalyst 41 from the NOx catalyst 41.

(2-4) Adsorbed HC Release Control

If a large amount of HC is released from the HC adsorbent 43 during execution of DeNOx control or DeSOx control, the temperature of the NOx catalyst 41 raised by DeNOx control or DeSOx control is further raised by an oxidation reaction of the released HC with the diesel oxidation catalyst 42. In particular, since the diesel oxidation catalyst 42, the HC adsorbent 43, and the NOx catalyst 41 are carried by a common carrier 43a in the embodiment, the oxidation reaction of HC with the diesel oxidation catalyst 42 easily raises the temperature of the NOx catalyst 41 excessively.

When the temperature of the NOx catalyst 41 raised excessively, the NOx purification performance and SOx purification performance (performance for adsorbing NOx and SOx and discharging the adsorbed NOx and SOx by reducing the adsorbed NOx and SOx) of the NOx catalyst 41 are declined. Specifically, when the temperature is raised excessively, particles of metal catalysts such as Ba (barium) included in the NOx catalyst 41 are sintered, thereby reducing the reactivity of the metal catalysts.

Therefore, in the embodiment, adsorbed HC release control for forcibly releasing HC from the HC adsorbent 43 is performed when the amount of HC adsorbed by the HC adsorbent 43 is equal to or more than a reference release amount to keep the amount of HC adsorbed by the HC adsorbent 43 small during execution of DeNOx control or DeSOx control.

In the embodiment, post injection is performed in the first half (from the compression top dead center to 90° C.A after the compression top dead center) of the expansion stroke as adsorbed HC release control to burn the injected fuel in the combustion chamber 6. When post injection is performed as described above, the temperature of exhaust can be raised. Then, when the temperature of exhaust is raised, the temperature of the HC adsorbent 43 to which exhaust is introduced is also raised and HC is released from the HC adsorbent 43.

Figure 7:
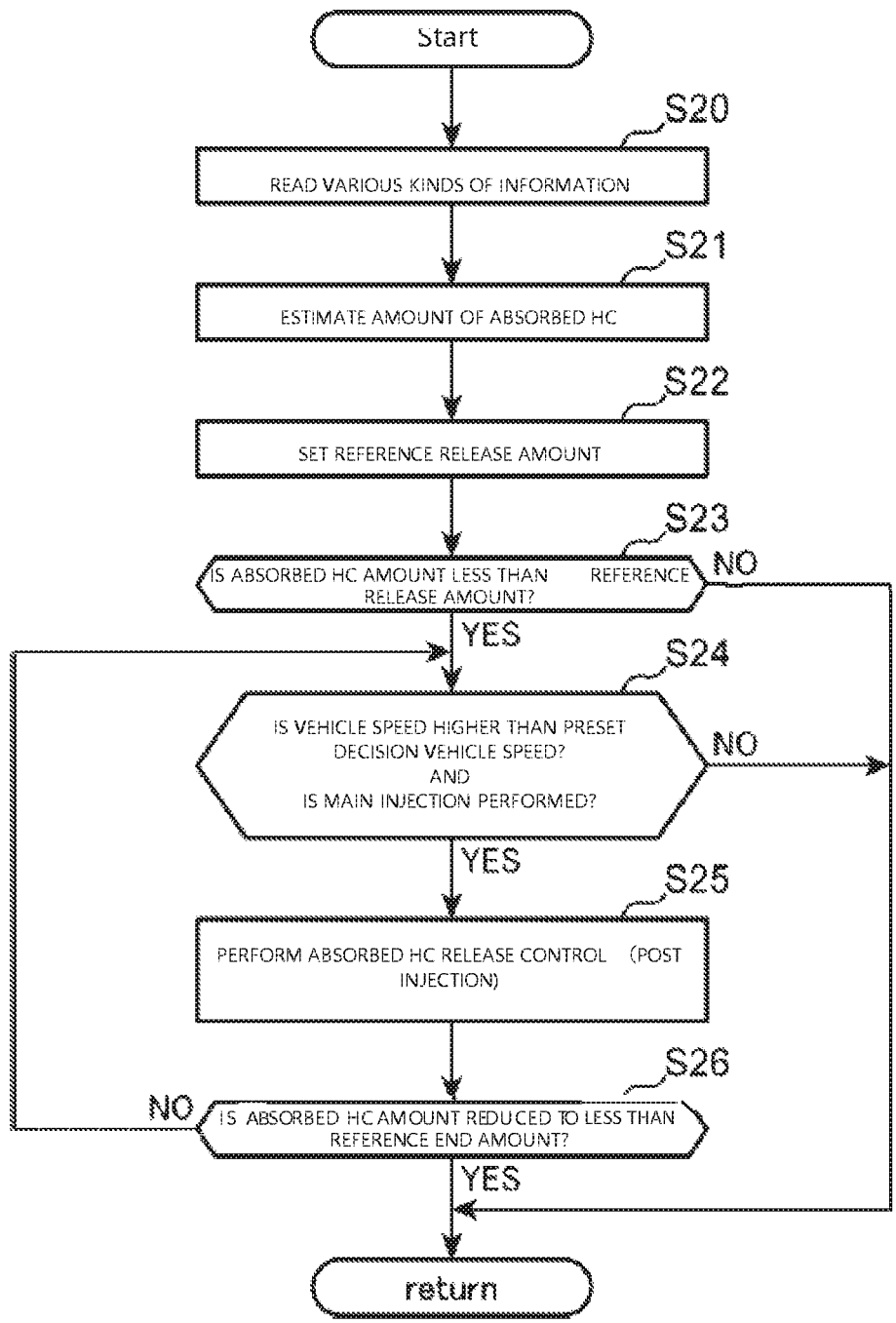
FIG. 7 is a flowchart illustrating a flow of adsorbed HC release control.

FIG. 7 is a flowchart illustrating a flow of adsorbed HC release control and details on adsorbed HC release control will be described with reference to this drawing.

First, in step S20, the PCM 200 reads various kinds of information of the vehicle. The PCM 200 reads at least the NOx catalyst temperature and the vehicle speed.

Next, in step S21, the PCM 200 estimates the amount (referred to below as the adsorbed HC amount) of adsorbed HC, which is HC adsorbed by the HC adsorbent 43. The adsorbed HC amount can be estimated by, for example, the procedure disclosed in JP-A-2015-068280, the contents of which is incorporated herein by reference.

Specifically, the PCM 200 estimates the amount of discharged HC, which is the amount of HC per unit time discharged from the combustion chamber 6 to the exhaust passage 40, based on the operational state (the engine load and the number of engine revolutions) of the engine. In addition, the PCM 200 calculates the adsorbable ratio, which is the ratio of the amount of HC actually adsorbable by the HC adsorbent 43 to the total amount of supplied HC, based on the state (the temperature of exhaust, the pressure of exhaust, and the flowrate of exhaust) of exhaust. Then, the PCM 200 calculates the amount of HC per unit time thought to be adsorbed by the HC adsorbent 43 based on the amount of discharged HC and the adsorbable ratio and estimates the adsorbed HC amount by integrating the calculated values.

Figure 8:
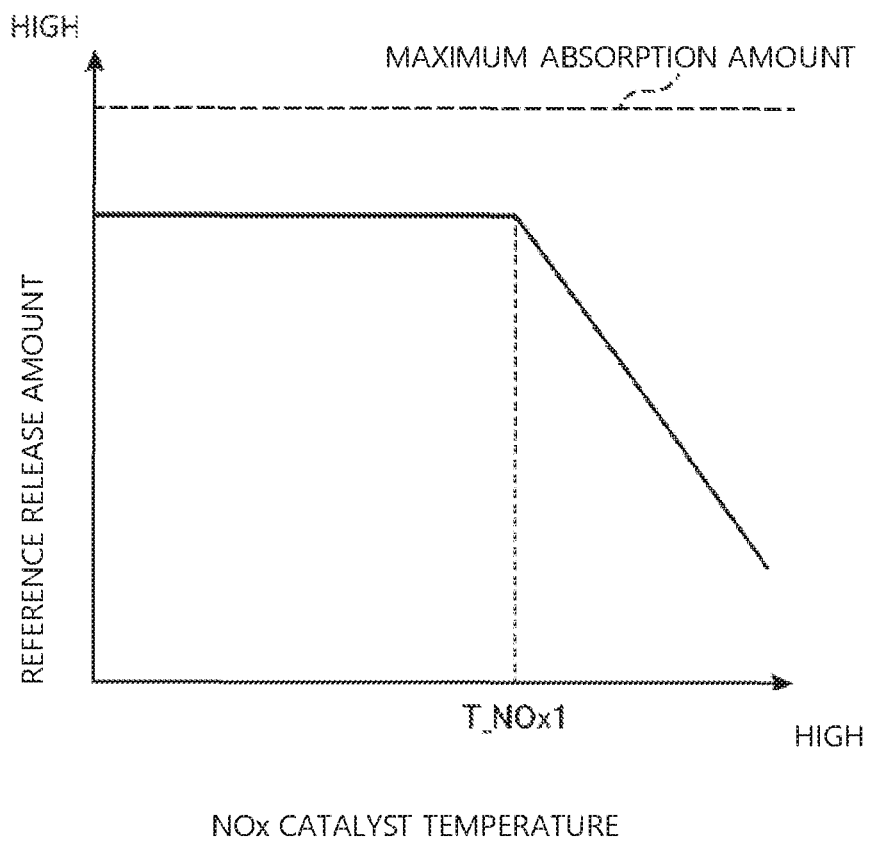
FIG. 8 is a graph illustrating the relationship between the temperature and the reference release amount of a NOx catalyst.

Next, in step S22, the PCM 200 sets a reference release amount (reference amount). The reference release amount is smaller than the maximum amount (maximum adsorption amount) of HC that can be adsorbed by the HC adsorbent 43 and is set to a value less than about two-thirds of this maximum amount. In the embodiment, the reference release amount is set to a smaller value when the NOx catalyst temperature is higher, as illustrated in FIG. 8. Specifically, when the NOx catalyst temperature is less than a predetermined temperature T_NOx1, the reference release amount is constant regardless of the NOx catalyst temperature. For example, when the NOx catalyst temperature is lower than the predetermined temperature T_NOx1, the reference release amount is about two-thirds of the maximum adsorption amount. In addition, the reference release amount is set to an amount approximately one-third or an amount less than one-third of the maximum adsorption amount at the maximum temperature that can be taken by the NOx catalyst 41 during travel of the vehicle. Then, when the NOx catalyst temperature is equal to or higher than the predetermined temperature T_NOx1, the reference release amount is reduced in proportion to the NOx catalyst temperature.

The PCM 200 stores the relationship between the NOx catalyst temperature and the reference release amount in a map and the PCM 200 extracts the value corresponding to the NOx catalyst temperature at the current time from the map.

After step S22, the processing proceeds to step S23. In step S23, the PCM 200 decides whether the adsorbed HC amount estimated in step S21 is equal to or more than the reference release amount set in step S22.

When the decision in step S23 is NO, that is, the adsorbed HC amount is less than the reference release amount, the PCM 200 ends the processing (the processing returns to step S20).

In contrast, the decision in step S23 is YES, that is, the estimated adsorbed HC amount is equal to or more than the reference release amount, the PCM 200 proceeds to step S24.

In step S24, the PCM 200 decides whether the vehicle speed is higher than a preset decision vehicle speed and main injection is performed. The decision vehicle speed is set to, for example, 0 or a value close to 0.

When the decision in step S24 is NO, that is, the vehicle speed is equal to or lower than the decision vehicle speed and the vehicle is stopped or almost stopped or the main injection is stopped (during a so-called fuel cut), the processing ends without doing anything (the processing returns to step S20).

In contrast, when the decision in step S24 is YES, that is, the vehicle speed is higher than the decision vehicle speed and the main injection is performed, the processing proceeds to step S25.

In step S25, the PCM 200 performs post injection. In addition, the PCM 200 performs this post injection at the time when the fuel injected into the combustion chamber 6 by the post injection is burnt in the combustion chamber 6.

After step S25, the processing proceeds to step S26. In step S26, a decision is made as to whether the adsorbed HC amount is less than a preset reference end amount. The reference end amount is set to a value less than the reference release amount. For example, the reference end amount is set to a value close to 0.

When the decision in step S26 is YES, that is, the adsorbed HC amount is reduced to less than the reference end amount, the processing ends (the processing returns to step S20). In contrast, when the decision in step S26 is NO, that is, the adsorbed HC amount is not reduced to the reference end amount, the processing returns to step S24.

As described above, post injection is performed at the time when the fuel is burnt as adsorbed HC release control in the embodiment. In addition, adsorbed HC release control (execution of post injection) is allowed to start when the adsorbed HC amount is equal to or more than the reference release amount and continues until the adsorbed HC amount is less than the reference end amount. However, since adsorbed HC release control is performed only when the vehicle speed is higher than the decision vehicle speed and main injection is performed, adsorbed HC release control is interrupted when the vehicle speed is equal to or lower than the decision vehicle speed or main injection is stopped. It should be noted here that, in the embodiment, if there is a request for DeNOx control or DeSOx control even when the adsorbed HC amount is not reduced to a value less than the reference end amount while adsorbed HC release control is performed, DeNOx control or DeSOx control is performed preferentially.

As described above, in the embodiment, the PCM 200 decides whether the adsorbed HC amount is equal to or more than the release reference amount and, when the decision is YES, the PCM 200 causes the injector 10 to perform post injection and raises the temperature of the HC adsorbent 43. The injector 10 that performs post injection and the PCM 200 mainly function as the HC controller that decides whether the amount of adsorbed HC, which is HC adsorbed by the HC adsorbent 43, is equal to or more than the release reference amount and, when deciding that the amount of adsorbed HC is equal to or more than the release reference amount, raises the temperature of the composite catalyst device (first purifying catalyst) 148.

Here, the HC released from the HC adsorbent 43 by performing adsorbed HC release control undergoes an oxidation reaction with the diesel oxidation catalyst 42 and emission is performed in the purified state. On the other hand, the oxidation reaction of HC raises the temperature of exhaust. In addition, adsorbed HC release control raises the temperature of the HC adsorbent 43 as described above. Therefore, although adsorbed HC release control raises the temperature of the NOx catalyst 41 and this may remove NOx from the NOx catalyst 41, since the SCR catalyst 46 is provided downstream of the composite catalyst device 148 as described above in the embodiment, the NOx removed from the NOx catalyst 41 can be purified by the SCR catalyst 46.

(2-5) DPF Regeneration Control

DPF regeneration control for regenerating the purification capability of the DPF 44 by removing PM collected by the DPF 44 will be described briefly.

DPF regeneration control is started when the temperature of the diesel oxidation catalyst 42 rises to enable an oxidation reaction and the amount of PM collected by the DPF 44 is equal to or more than a predetermined value and stopped when the amount of PM is less than the predetermined value. In DPF regeneration control, post injection is performed at the time when the injected fuel is not burnt in the combustion chamber 6 while the air-fuel ratio of the air-fuel mixture is larger than the theoretical air-fuel ratio. This increases oxidation reactions between the unburnt fuel and air in the diesel oxidation catalyst 42, raises the temperature of exhaust and thereby the temperature of the DPF 44, and burns and removes the PM collected by the DPF 44.

(3) Effects Etc

As described above, the exhaust passage 40 is provided with the HC adsorbent 43 that adsorbs HC at a low temperature and releases HC at a high temperature in the embodiment. Therefore, since HC discharged from the engine body 1 during cold start of the engine can be adsorbed by the HC adsorbent 43, the emission of HC to the outside of the exhaust passage 40 can be suppressed. In addition, since the diesel oxidation catalyst 42 and the NOx catalyst 41 are provided in the exhaust passage 40, the emission of HC, CO, and NOx to the outside of the exhaust passage 40 can be suppressed.

In addition, since the HC adsorbent 43 is provided integrally with the NOx catalyst 41 and the diesel oxidation catalyst 42, they can be disposed in the exhaust passage 40 compactly.

In addition, since DeNOx control and DeSOx control are performed, the purification performance of the NOx catalyst 41 can be kept high.

Moreover, in the embodiment, a decision is made as to whether the amount of HC adsorbed by the HC adsorbent 43, that is, the amount of adsorbed HC is equal to or more than the preset reference release amount and, when the amount of adsorbed HC is equal to or more than the reference release amount, adsorbed HC release control is performed in which post injection is performed so that the injected fuel is burnt in the combustion chamber 6. Then, this raises the temperature of the HC adsorbent 43. Therefore, the amount of HC adsorbed by the HC adsorbent 43 can be always kept small (less than at least the reference release amount), thereby suppressing the release of a large amount of HC from the HC adsorbent 43 during execution of DeNOx control or DeSOx control. Accordingly, the decline of the purification performance of the NOx catalyst 41 can be suppressed because a large amount of HC is not released from the HC adsorbent 43 during execution of DeNOx control or DeSOx control and the NOx catalyst 41 is not sintered.

In particular, this post injection is continuously performed basically until the amount of adsorbed HC is reduced to less than the reference end amount, which is a value close to 0 or the like less than the reference release amount, in the embodiment. Therefore, the adsorbed HC amount at the time of execution of DeNOx control or DeSOx control can be reduced reliably.

In addition, in the embodiment, the reference release amount when the temperature of the NOx catalyst 41 is high is smaller than the reference release amount when the temperature is small. Therefore, when the temperature of the NOx catalyst 41 is high and there is a small margin until the temperature at which sintering occurs, HC is released from the HC adsorbent 43 when relatively small HC is stored in the HC adsorbent. Accordingly, a further rise in the temperature of the NOx catalyst 41 caused by an oxidation reaction of HC adsorbed by the HC adsorbent 43 can be kept small, reliably preventing occurrence of sintering. In contrast, when the temperature of the NOx catalyst 41 is low, the temperature of the HC adsorbent 43 is not raised until a relatively large amount of HC is stored in the HC adsorbent 43. Therefore, opportunities for performing post injection to raise the temperature of the HC adsorbent 43 can be reduced, thereby suppressing decline in the fuel economy performance.

In addition, the SCR catalyst 46 is provided downstream of the composite catalyst device 148 including the HC adsorbent 43 in the embodiment. Therefore, even when NOx is removed from the NOx catalyst 41 because execution of adsorbed HC release control raises the temperature of the HC adsorbent 43 and thereby raises the temperature of the NOx catalyst 41, the SCR catalyst 46 can purify the NOx. Accordingly, it is possible to prevent NOx from being discharged to the outside of the exhaust passage 40 more reliably.

(4) Modification

Although an example in which the SCR catalyst 46 is provided downstream of the composite catalyst device 148 of the exhaust passage 40 is described in the embodiment, the SCR catalyst 46 may be omitted. However, if the SCR catalyst 46 is provided, even when NOx is released from the NOx catalyst 41 of the composite catalyst device 148, the discharged NOx can be purified by the SCR catalyst 46 as described above.

In addition, the reference release amount may be set to a larger value when the amount of NOx (so-called low NOx) discharged from the combustion chamber 6 is larger.

Specifically, the amount of NOx discharged from the combustion chamber 6 is estimated based on the operational state (including the engine load, the number of engine revolutions, and the like) of the engine and the reference release amount is corrected so that the reference release amount is smaller as the amount of discharged NOx is larger. In this way, by effectively suppressing a rise in the temperature of the NOx catalyst 41 when DeNOx control or DeSOx control is performed in an operational state in which the amount of NOx discharged from the combustion chamber 6 is large, degradation of the NOx catalyst 41 can be suppressed reliably. Specifically, during execution of DeNOx control or DeSOx control, NOx discharged from the combustion chamber 6 reacts with unburnt fuel in the NOx catalyst 41 to generate ammonia, the generated ammonia may undergo an oxidation reaction by receiving, for example, the effect of the diesel oxidation catalyst 42, and the temperature of the NOx catalyst 41 may be raised by this reaction heat. Therefore, if the amount of HC adsorbed by the HC adsorbent 43 is kept small by reducing the reference release amount in the operational state in which the amount of NOx discharged from the combustion chamber 6 is large as described above, when DeNOx control or DeSOx control is performed in this operational state, it is possible to prevent the temperature of the NOx catalyst 41 from being raised excessively by an oxidation reaction of HC and an oxidation reaction of ammonia described above.

In addition, although all of the NOx catalyst 41, the diesel oxidation catalyst 42, and the HC adsorbent 43 are carried by the same carrier 48a in the embodiment, the catalysts and adsorbent may be carried by the different carriers 48a.

DESCRIPTION OF REFERENCE SIGNS AND NUMERALS

1: engine body
10: injector (fuel injector)
41: NOx catalyst
42: diesel oxidation catalyst
43: HC adsorbent
46: SCR catalyst
148: composite catalyst device (first purifying catalyst, second purifying catalyst)
48a: carrier
200: PCM (controller, control circuitry, circuitry)

The invention claimed is:

1. An exhaust emission control device for an engine, the exhaust emission control device comprising:
a first purifying catalyst provided in an exhaust passage through which exhaust flows and is discharged, the engine including an engine body having a cylinder formed therein and connected to the exhaust passage, the first purifying catalyst including
a hydrocarbon (HC) adsorbent that adsorbs HC at or below a first temperature and releases HC at or above a second temperature, the first temperature being lower than the second temperature and
a diesel oxidation catalyst capable of oxidizing HC;
a second purifying catalyst provided in the exhaust passage, the second purifying catalyst including a NOx catalyst capable of storing NOx contained in exhaust;
a fuel injector configured to controllably inject fuel into the cylinder; and
circuitry configured to
perform post fuel injection control of the fuel injector to regenerate the NOx catalyst while raising a temperature of the NOx catalyst,
determine whether an amount of adsorbed HC that is HC adsorbed by the HC adsorbent is equal to or greater than a preset reference amount of HC, and
in response to a determination that the amount of the adsorbed HC is equal to or greater than the reference amount, raise a temperature of the first purifying catalyst.

2. The exhaust emission control device for the engine according to claim 1, wherein
the circuitry is further configured to cause the fuel injector to inject the fuel into the cylinder in a first half of a combustion stroke burn the fuel in the cylinder in response to making a determination that the amount of the adsorbed HC is equal to or more than the reference amount.

3. The exhaust emission control device for the engine according to claim 1,
wherein the circuitry is configured to change the reference amount to a smaller reference amount in response to the temperature of the NOx catalyst being determined to have changed from a higher temperature to a lower temperature.

4. The exhaust emission control device for the engine according to claim 3,
wherein the circuitry is configured to set the reference amount to a constant value independent of the temperature of the NOx catalyst in response to a determination that the temperature of the NOx catalyst is less than a predetermined temperature.

5. The exhaust emission control device for the engine according to claim 1, wherein
the circuitry is further configured to perform post fuel injection control of the fuel injector so as to raise the temperature of the NOx catalyst to remove SOx stored in the NOx catalyst from the NOx catalyst.

6. The exhaust emission control device for the engine according to claim 1, further comprising:
a SCR catalyst provided downstream of the second purifying catalyst in the exhaust passage that purifies NOx contained in the exhaust using ammonia.

7. The exhaust emission control device for the engine according to claim 1,
wherein the first purifying catalyst and the second purifying catalyst are included in a common housing, and the HC adsorbent, the diesel oxidation catalyst, and the NOx catalyst are carried by a common carrier.

8. The exhaust emission control device for the engine according to claim 1,
wherein the circuitry is further configured to estimate the amount of the adsorbed HC by integrating an amount of HC adsorbed by the HC adsorbent per unit time estimated based on an amount of HC discharged from the cylinder to the exhaust passage per unit time estimated based on an operational state of the engine and an adsorbable ratio set according to a state of exhaust gas.

9. The exhaust emission control device for the engine according to claim 8, wherein the operational state of the engine includes an engine load and a number of engine revolutions.

10. The exhaust emission control device for the engine according to claim 1, wherein the present reference amount of HC is set to two-thirds or less of a maximum amount of HC that can be adsorbed by the HC adsorbent.

11. The exhaust emission control device for the engine according to claim 1, wherein the circuitry includes a memory and the circuitry is configured to hold in the memory a map of a relationship between NOx catalyst temperature and preset reference amount of HC.

12. The exhaust emission control device for the engine according to claim 1, wherein the circuitry is configured to perform DeNOx control in at least one of a first engine operation range and a second engine operation range, wherein
the first engine operation range having engine revolutions being equal to or more than a preset first reference number of revolutions N1 and equal to or less than a preset second reference number of revolutions N2, and an engine load being equal to or higher than a preset first reference load Tq1 and equal to or lower than a preset second reference load Tq2, and
the second engine operation range having the engine load being higher than for the first operation range and equal to or higher than a preset third reference load Tq3.

13. A method for controlling exhaust emissions from an engine, the method comprising:
purifying exhaust with a first purifying catalyst disposed in an exhaust passage through which the exhaust flows and is discharged, the engine including an engine body having a cylinder formed therein and connected to the exhaust passage, the first purifying catalyst including
a hydrocarbon (HC) adsorbent that adsorbs HC at or below a first temperature and releases HC at or above a second temperature, the first temperature being lower than the second temperature and
a diesel oxidation catalyst capable of oxidizing HC;
storing NOx contained in the exhaust with a second purifying catalyst provided in the exhaust passage, the second purifying catalyst including a NOx catalyst;
regenerating the NOx catalyst by performing post fuel injection control of a fuel injector to regenerate the NOx catalyst while raising a temperature of the NOx catalyst; and
determining, with circuitry, whether an amount of adsorbed HC that is HC adsorbed by the HC adsorbent is equal to or greater than a preset reference amount of HC, and
in response to a determination that the amount of the adsorbed HC is determined to be equal to or greater than the reference amount, raising a temperature of the first purifying catalyst.

14. The method for controlling exhaust emissions from the engine according to claim 13, further comprising:
controlling the fuel injector with the circuitry to inject the fuel into the cylinder in a first half of a combustion stroke and causing the fuel to burn in the cylinder in response to making a determination that the amount of the adsorbed HC is equal to or more than the reference amount.

15. The method for controlling exhaust emissions from the engine according to claim 13, further comprising:
changing with the circuitry the reference amount to a smaller reference amount in response to the temperature of the NOx catalyst being determined to have changed from a higher temperature to a lower temperature.

16. The method for controlling exhaust emissions from the engine according to claim 15, further comprising:
setting, with the circuitry, the reference amount to a constant value regardless of the temperature of the NOx catalyst in response to a determination that the temperature of the NOx catalyst is less than a predetermined temperature.

17. The method for controlling exhaust emissions from the engine according to claim 13, wherein
the performing post fuel injection control includes raising the temperature of the NOx catalyst to remove SOx stored in the NOx catalyst from the NOx catalyst.

18. A non-transitory computer readable medium having computer instructions stored therein that when executed by a processor cause the processor to perform a method for controlling exhaust emissions from an engine, the method comprising:
purifying exhaust with a first purifying catalyst disposed in an exhaust passage through which the exhaust flows and is discharged, the engine including an engine body having a cylinder formed therein and connected to the exhaust passage, the first purifying catalyst including
a hydrocarbon (HC) adsorbent that adsorbs HC at or below a first temperature and releases HC at or above a second temperature, the first temperature being lower than the second temperature and
a diesel oxidation catalyst capable of oxidizing HC;
storing NOx contained in the exhaust with a second purifying catalyst provided in the exhaust passage, the second purifying catalyst including a NOx catalyst;
regenerating the NOx catalyst by performing post fuel injection control of a fuel injector to regenerate the NOx catalyst while raising a temperature of the NOx catalyst; and
determining whether an amount of adsorbed HC that is HC adsorbed by the HC adsorbent is equal to or greater than a preset reference amount of HC, and
in response to a determination that the amount of the adsorbed HC is determined to be equal to or greater than the reference amount, raising a temperature of the first purifying catalyst.

19. The non-transitory computer readable medium of claim 18, wherein the method further comprising:
controlling the fuel injector with the to inject the fuel into the cylinder in a first half of a combustion stroke and causing the fuel to burn in the cylinder in response to making a determination that the amount of the adsorbed HC is equal to or more than the reference amount.

20. The non-transitory computer readable medium of claim 18, wherein the method further comprising:
changing with the circuitry the reference amount to a smaller reference amount in response to the temperature of the NOx catalyst being determined to have changed from a higher temperature to a lower temperature.

* * * * *